July 25, 1967   S. A. HEENAN   3,332,327
PAVEMENT MARKER
Filed Oct. 23, 1964   2 Sheets-Sheet 1

INVENTOR.
SIDNEY A. HEENAN
BY Arthur Jacob
ATTORNEY

July 25, 1967  S. A. HEENAN  3,332,327
PAVEMENT MARKER
Filed Oct. 23, 1964
2 Sheets-Sheet 2
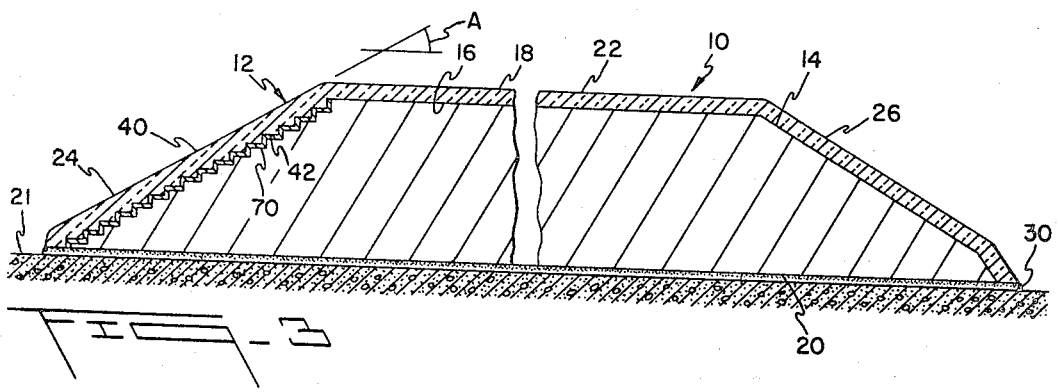
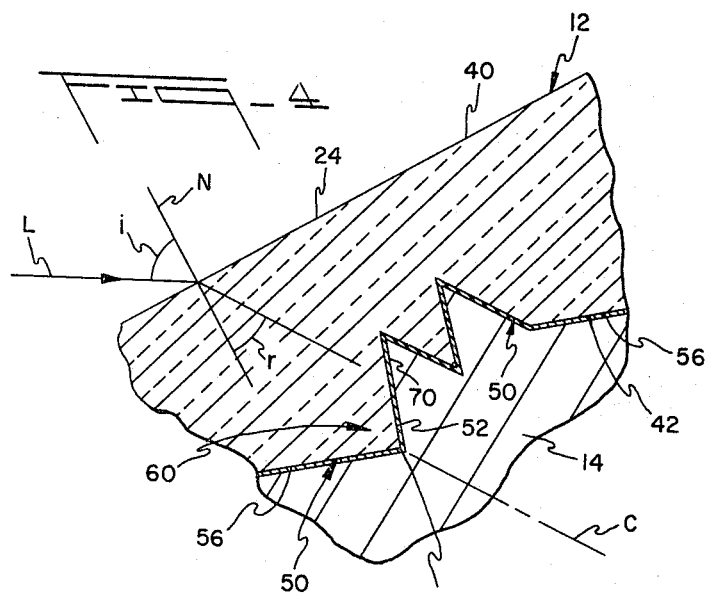
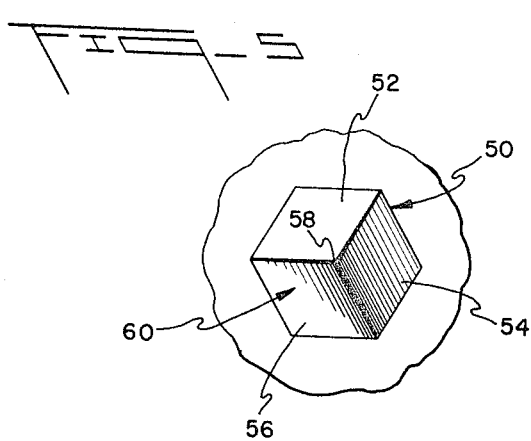
INVENTOR.
SIDNEY A. HEENAN
BY *Arthur Jacob*
ATTORNEY

United States Patent Office 3,332,327
Patented July 25, 1967

3,332,327
PAVEMENT MARKER
Sidney A. Heenan, Park Ridge, Ill., assignor to Elastic Stop Nut Corporation of America, Union, N.J., a corporation of New Jersey
Filed Oct. 23, 1964, Ser. No. 406,045
16 Claims. (Cl. 94—1.5)

ABSTRACT OF THE DISCLOSURE

In a pavement marker for establishing a marking visible from an oncoming vehicle on a generally horizontal roadway surface, a generally horizontal base adapted for engagement with the roadway surface, and a body of light-transmitting synthetic resin having an outer surface including an obverse light receiving and refracting face and an inner surface including reverse light receiving and reflecting face provided with a plurality of retrodirective reflector elements of the cube corner type for receiving light emanating from the oncoming vehicle and incident upon the obverse face in a generally horizontal direction of incidence and reflecting such light to return the incident light generally parallel to the direction of incidence. The obverse face makes an acute angle of at least 15° with the base to rise above the roadway surface upon which the pavement marker is to be installed for maintaining adequate optical effectiveness of the marker while allowing wiping of the obverse face by contact with the oncoming vehicle. The reflector elements each have a cube corner axis and the reflector elements are oriented such that each cube corner axis makes an acute angle with the normal to the obverse face in order to align the cube corners relative to the light refracted as a result of the acute angle of the obverse face for receiving such refracted light and reflecting the refracted light to return the incident light generally parallel to the direction of incidence after refraction of the reflected light at the obverse face.

---

The present invention relates generally to pavement markers and pertains more specifically to roadway traffic markers employing reflectors which are cleaned by the action of vehicular traffic on the roadway contacting the marker to maintain optical effectiveness during service.

Pavement markers of the reflecting type have enjoyed a high degree of acceptance in providing roadway markings visible from oncoming vehicles under nighttime conditions as a result of their ability to reflect light emanating from such vehicles. Experience has shown that the optical effectiveness of such markers will diminish rapidly during service as a a result of the accumulation of dirt and other deposits which will form a film over the reflector system and inhibit the passage of light. Conventional pavement markers have sought to overcome the above difficulty by providing a variety of wiping mechanisms which are actuated by the contact of vehicular traffic with the marker structure to clean the reflector surfaces and maintain their optical effectiveness. Such conventional devices usually employ moving parts and generally demand relatively high installation costs due to the requirement that they be embedded within the pavement.

It is therefore an important object of the invention to provide a pavement marker having an effective reflector system which will maintain its optical effectiveness during service without requiring complex wiping mechanisms.

Another object of the invention is to provide a pavement marker of simplified design and construction which can be installed readily and economically upon a roadway surface and which will withstand the constant contact with road traffic inherent in such an installation.

Still another object of the invention is to provide a pavement marker employing a reflector system which will resist optical deterioration arising out of the accumulation of light transmission impeding film as well as mechanical abrasion by passing roadway traffic.

A further object of the invention is to provide a pavement marker of simplified, inexpensive construction having a minimum number of component parts and capable of ready installation upon the surface of the pavement.

A still further object of the invention is to provide a pavement marker of the reflecting type which is self-cleaning in that it makes use of normal contact with oncoming traffic to maintain optical effectiveness in the reflector system and does so with no moving component parts.

Another object of the invention is to provide a highly effective, self-cleaning reflecting type pavement marker fabricated of relatively inexpensive materials and capable of economical installation and maintenance.

The invention may be described briefly as providing, in a pavement marker for establishing a marking on a generally horizontal roadway surface, the marking being visible from an oncoming vehicle on the roadway, a body of light-transmitting synthetic resin having an outer surface including an obverse light receiving and refracting face and an inner surface including a reverse light receiving and reflecting face. A triple mirror reflex reflecting system is provided in the reverse face for receiving light emanating from the oncoming vehicle and incident upon the obverse face in a generally horizontal direction of incidence and reflecting such light generally parallel to the direction of incidence. The obverse face is so oriented as to make an acute angle with the horizontal and to rise above the roadway surface upon which the pavement marker is to be installed for maintaining adequate optical effectiveness of the reflex reflecting system during service, the acute angle being great enough to reduce optical deterioration of the obverse face arising out of contact with the oncoming vehicle while being small enough to allow adequate wiping of the obverse face by such contact. Additionally, the reflex reflecting system may include a plurality of light reflecting elements, each element having three planar surfaces arranged mutually at right angles and meeting at a common point remote from the obverse face to form a cube corner, the axis through the cube corner of each reflecting element being at an angle with the normal to the obverse face for allowing the reflecting elements to receive light emanating in a generally horizontal direction from the oncoming vehicle and refracted by the obverse face as a result of the acute angle and to reflect such light generally parallel to the direction of incidence of the light upon the obverse face after refraction of the reflected light at said obverse face.

The invention will be more fully understood and additional objects and advantages thereof will become apparent in the following detailed description of an embodiment of the invention illustrated in the accompanying drawings in which:

FIGURE 3 is a cross-sectional view taken along the line 3—3 of FIGURE 2;

FIGURE 4 is an enlarged detail of a portion of FIGURE 3; and

FIGURE 5 is a fragmentary view of the reverse face of the reflector illustrated in FIGURE 4, taken in a direction parallel to the cube corner axes of the reflector of FIGURE 4.

Figure 1:
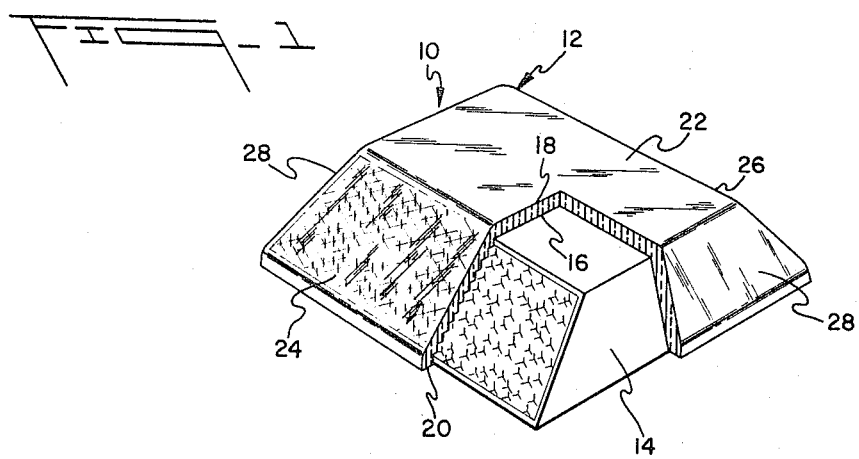
FIGURE 1 is a partially sectioned perspective view of a pavement marker constructed in accordance with the invention.

Referring now to the drawings, a pavement marker constructed in accordance with the invention is shown in perspective at 10 in FIGURE 1 and includes a body of light transmitting synthetic resin illustrated in the form of a shell 12 partially sectioned to show that it is filled, or "potted," with a relatively rigid filler material seen in the form of a solid core 14 which is contiguous with the inner surface 16 of the shell and serves to reinforce the shell 12 and provide a solid, rugged structure capable of withstanding forces applied to the pavement marker when the outer surface 18 of the marker is struck by vehicular traffic during service.

Figure 2:
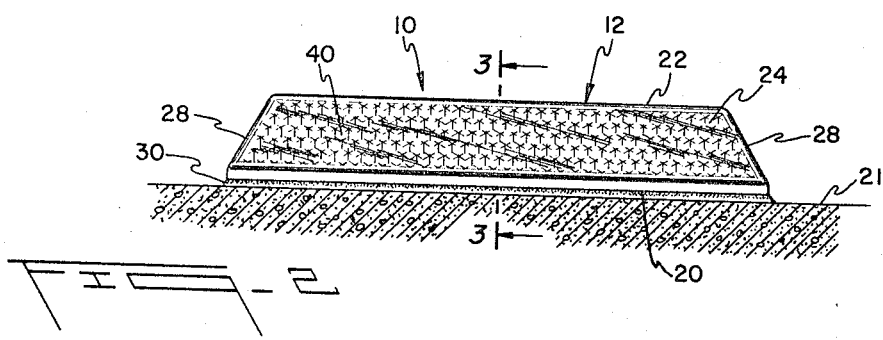
FIGURE 2 is a front elevational view of the pavement marker of FIGURE 1.

The pavement marker 10 is usually employed to provide a marking on a generally horizontal roadway surface, the marking being visible from an oncoming vehicle on the roadway to delineate traffic lanes, and, as best seen in FIGURES 2 and 3, is thus provided with a generally horizontal base 20 for cooperatively engaging the roadway surface 21 upon which the marker is to be installed. Shell 12 is further provided with a generally horizontal top 22 which is raised vertically above the base 20. Opposite front and rear faces 24 and 26, respectively, and opposite sides 28 interconnect base 20 and top 22 to complete the shell 12. The marker is fixed in place upon the roadway surface 21 by an adhesive 30 which secures the marker 10 at any desired location upon the pavement without requiring any recessing or other disruption of the pavement surface.

Pavement marker 10 is a reflecting type marker and employs a reflecting system to provide a visible marking by receiving light emanating from an oncoming vehicle and reflecting such light back toward the vehicle. The reflecting system is located in front face 24 which is oriented so as to receive light from oncoming vehicular traffic. In order to provide the necessary visual marking, the reflector system must be initially optically efficient and the marker must be so designed as to maintain the optical effectiveness of the reflector system throughout the useful life of the marker.

One of the most effective reflecting systems available employs the well known triple mirror reflex reflecting principle which is thoroughly explained in the Stimson U.S. Patent No. 1,906,655, issued May 2, 1933, wherein there is disclosed a reflex light reflector including an obverse light receiving face and a reverse light reflecting face consisting of a plurality of cube corners, each having three surfaces adapted for total internal reflection of light impinging thereon from the obverse face. Each of Stimson's cube corners has an axis and the cube corner axes are parallel to one another. For maximum optical efficiency, it is usual for such reflectors to be oriented with the cube corner axes essentially aligned with the direction of the nominal incident light. Since the light emanating from oncoming vehicles is practically parallel to the roadway surface at distances where a pavement marker should provide a mark visible from the vehicle, it would at first appear that use of the above described reflecting system would necessitate having the obverse face of the reflector essentially perpendicular to the roadway surface. It has been observed, however, that such perpendicular surfaces will collect dirt and a light impeding film will appear, which film will very rapidly reduce the optical effectiveness of such a reflecting system. Thus, some means is required for periodically cleaning the obverse face of the reflector.

It has been discovered that if the obverse face of the reflector system is oriented horizontally, or parallel to the roadway surface, rather than vertically, the normal contact between the tires of passing vehicles and the obverse face will wipe the face clean and the reflector system can retain its optical effectiveness while in service. Unfortunately, however, such contact between oncoming vehicles and the obverse face will also give rise to abrasion of the surface of the obverse face which will rapidly deteriorate the optical quality of the face and reduce the optical effectiveness of the reflector. Such abrasion can be reduced by orienting the obverse face perpendicular to the roadway surface, or in a vertical plane. Thus, on one hand, the obverse face should be oriented toward the vertical to achieve initial optical efficiency and to reduce optical deterioration arising out of contact with oncoming vehicles but on the other hand, should be oriented toward the horizontal to allow the face to be periodically wiped clean by such contact. Additionally, a planar face projecting vertically from the roadway surface could become a traffic hazard while a horizontal face would reduce such a hazard.

Pavement marker 10 provides an optically effective reflecting system which remains effective during service and still takes advantage of the wiping action arising out of contact with oncoming traffic. To this end, the marker 10 is provided with a reflector system in front face 24 which face is presented to the oncoming traffic, the reflector system including a generally planar obverse light receiving face 40 on the outer surface of the shell 12 and a reverse light receiving face 42 on the inner surface of the shell (see FIGURE 3). The obverse face 40 is neither vertical nor horizontal, but is at an acute angle A to the roadway surface 21. Acute angle A is chosen so as to be great enough to place the reflector system near enough to the vertical to be optically effective, but it is also small enough to allow adequate wiping of the obverse face 40 by contact with the tires of oncoming vehicles. Acute angle A is also great enough to reduce optical deterioration of the observe face 40 arising out of abrasion of the face by such contact with oncoming vehicles. Additionally, angle A is small enough to prevent pavement marker 10 from becoming a traffic hazard.

It has been found that shell 12 can be successfully fabricated of a light transmitting synthetic resin and can thus be molded in a unitary component as illustrated. One such synthetic resin is methyl methacrylate which will exhibit the necessary optical properties and will withstand the constant contact of oncoming traffic during service.

Good results in maintaining optical effectiveness and in achieving adequate wiping action have been attained with an angle A of 30°. Theory indicates and experience has shown, however, that satisfactory results can be realized where angle A is from 15° to approximately 45°.

Referring now to FIGURES 3 through 5, the reflecting system employed in pavement marker 10 is a triple mirror reflex reflector system in principle, the reverse face 42 containing a plurality of light reflecting elements 50 each of which is adapted for total internal reflection of light impinging on the reverse face 42.

Each reflector element 50 has three substantially square planar surfaces 52, 54 and 56 arranged mutually at right angles and meeting at a common point 58 remote from the obverse face 40, thus forming a cube corner 60 (also see FIGURE 5). Each cube corner 60 has an axis (the diagonal of the cube passing through the cube corner), one of which is illustrated at C in FIGURE 4. The axes of all cube corners 60 are parallel to one another, although they need not necessarily be parallel.

Light emanating from the headlamps of an oncoming vehicle on the roadway is represented by ray L in FIGURE 4 and is essentially parallel to the horizontal surface of the road. In actuality, ray L will vary from the horizontal by about only 6° while the vehicle passes through the zone where the reflecting system is required to provide a mark visible from the vehicle. Because obverse face 40 makes an acute angle A with the horizontal roadway surface, ray L will be incident upon obverse face 40 at an angle of incidence $i$ with the normal N to the obverse face and will be refracted upon passage into the material of shell 12 at an angle of refraction $r$ as the light proceeds toward reverse face 42. Where the index of refraction of the material of shell 12 is $u$, light ray L will be refracted in accordance with the following formula:

$$u = \frac{\sin i}{\sin r}$$

and the angle of refraction $r$ can be expressed as:

$$r = \sin^{-1}\left(\frac{\sin i}{u}\right)$$

In ordinary triple mirror reflector structures the axes of the cube corners are aligned parallel with the normal to the obverse face and the obverse face is generally located in a plane which is perpendicular or very nearly perpendicular to the nominal incident light so that any refraction which may take place at the obverse face is generally of a negligible magnitude. Since maximum efficiency of such a reflector is realized when the light impinging upon the reverse face is parallel to the axes of the cube corners, maximum efficiency is easily attained in ordinary reflector structures. However, in pavement marker 10, obverse face 40 lies in a plane making a nominal angle of 30° with the horizontal and angle of incidence $i$ is approximately 60°. The angle of refraction $r$ then becomes substantial. For example, where shell 12 is molded of methyl methacrylate, $u$ is 1.5 and the angle of refraction $r$ will be 35°16′. If the cube corner axes were aligned with the normal N to the obverse face as in ordinary reflex reflector structures, the optical efficiency of the reflector system would suffer severely from the large angle of incidence. However, by aligning the cube corner axes of reflector elements 50 with the direction of the refracted light rays, that is, at an angle $r$ to the normal N, maximum efficiency of the reflector is maintained despite the rather large angle of incidence.

It is noted that while ideally the cube corner axes should be aligned exactly parallel with the direction of the refracted light rays as computed above for maximum efficiency, in practice it has been found that adequate performance can be attained when the alignment of the cube corner axes is within about 13° of the computed direction of the refracted rays. Hence, general alignment of the cube corner axes with the refracted light will give rise to satisfactory operation of the pavement marker.

It will be apparent that the angle of incidence will increase with a decrease in angle A and the greater the angle of incidence, the greater the transmission losses at face 24, both entering and leaving the face, and the greater the angular error of the return ray caused by small error in the reflecting cube. For optical reasons, then, as well as for the reduction of abrasion arising out of contact with oncoming traffic, it has been determined that angle A should not be decreased below 15°.

Shell 12 is readily fabricated by currently established molding techniques and pavement marker 10 is completed by filling the molded shell with a material which will adhere to inner surface 16 and harden to form solid core 14. Such materials as epoxy compounds have been found suitable for the formation of core 14. Since it is desirable from a structural standpoint that the core 14 be contiguous with shell 12 and no voids exist between shell 12 and core 14, reverse face 42 is coated with a light reflecting material 70, such as by metallizing the reverse face in a now well known manner, to assure that the reflecting elements 50 will perform their assigned function.

It will be noted that the overall appearance of the marker is pleasing as well as functional. The device presents no hazard to passing traffic since both sides 28 as well as both faces 24 and 26 are at an angle to the vertical which will reduce the shock imparted to the tires of contacting vehicles.

Although the illustrated device is monodirectional in that only face 24 is provided with a reflecting system, it will be apparent that a similar reflecting system could be provided in face 26 to render the marker bidirectional. The employment of a molded plastic shell 12 allows the marker to be fabricated in a multitude of colors, all of which can be molded throughout the shell so as not to be worn away during service.

It will be apparent that pavement marker 10 is well adapted to the attainment of the stated objects and advantages. The marker is self-cleaning without requiring moving component parts and will exhibit exemplarly performmance over a relatively long useful life.

The above detailed description is provided by way of example only. Various details of design and construction may be modified without departing from the true spirit and scope of the invention as defined in the appended claims.

What is claimed is:

1. In a pavement marker for providing a marking on a generally horizontally directed roadway surface, the marking being visible from an oncoming vehicle on the roadway:

a generally horizontal base adapted for engagement with said roadway surface;

a body of light transmitting synthetic resin having an outer surface including an obverse light receiving and refracting face and an inner surface including a reverse light receiving and reflecting face;

a reflex reflecting system including a plurality of retrodirective reflector elements of the cube corner type in said reverse face for receiving light emanating from the vehicle and incident upon said obverse face in a generally horizontal direction of incidence and reflecting such light to return the light generally parallel to the direction of incidence;

said obverse face making an acute angle of at least 15° with the base to rise above the roadway surface upon which the pavement marker is to be installed for maintaining adequate optical effectiveness of the pavement marker during service while allowing wiping of said obverse face by contact with the oncoming vehicle; and each of said reflector elements having three planar surfaces arranged mutually at right angles and meeting at a common point remote from said obverse face to form a cube corner, and an axis passing through the cube corner of each reflector element, said reflector elements being oriented such that each cube corner axis makes an acute angle with the normal to the obverse face to align the cube corners relative to the light refracted as a result of the acute angle of the obverse face for receiving such refracted light and reflecting the refracted light to return the incident light generally parallel to the direction of incidence after refraction of the reflected light at the obverse face.

2. The invention set forth in claim 1 wherein the acute angle with the base is from 15° to approximately 45°.

3. The invention set forth in claim 2 wherein the alignment of each cube corner axis is within about 13° of the direction of the refracted light.

4. The invention set forth in claim 1 wherein said acute angle with the base is about 30°.

5. The invention set forth in claim 1 wherein the alignment of each cube corner axis is within about 13° of the direction of the refracted light.

6. The invention set forth in claim 1 wherein each said axis is aligned generally parallel with the direction of said light refracted at said obverse face.

7. The invention as set forth in claim 1 wherein said acute angle with the base is from 15° to approximately 45° and the body of light transmitting synthetic resin is methyl methacrylate having a predetermined index of refraction $u$ of about 1.5 and light emanating generally horizontally from said oncoming vehicle impinges upon said obverse face at a predetermined angle of incidence $i$, the axis of each said reflector element making an angle in the order of magnitude of $$\sin^{-1}\left(\frac{\sin i}{u}\right)$$

with the normal to the obverse face.

8. A pavement marker for providing a marking on a horizontally directed roadway surface, the marking being visible from an oncoming vehicle on the roadway, said pavement marker comprising:

a shell-like body of light transmitting synthetic resin material having a generally horizontal base adapted for engagement with said roadway surface and an outer surface including a generally planar obverse light receiving and refracting face and an inner surface including a reverse light receiving and reflecting face;

a reflex reflecting system including a plurality of retro-directive reflector elements of the cube corner type in said reverse face for receiving light emanating from the oncoming vehicle and incident upon said obverse face in a generally horizontal direction of incidence and reflecting such light to return the light generally parallel to the direction of incidence after refraction at said obverse face;

said obverse face being so oriented as to make an acute angle of at least 15° with the base to rise above the roadway surface upon which the pavement marker is to be installed for maintaining adequate optical effectiveness of the pavement marked during service while allowing wiping of said obverse face by contact with the oncoming vehicle;

each of said reflector elements having three planar surfaces arranged mutually at right angles and meeting at a common point remote from said obverse face to form a cube corner, and an axis passing through the cube corner of each reflector element, said reflector elements being oriented such that each cube corner axis makes an acute angle with the normal to the obverse face to align the cube corners relative to the light refracted as a result of the acute angle of the obverse face for receiving such refracted light and reflecting the refracted light to return the incident light generally parallel to the direction of incidence after refraction of the reflected light at the obverse face;

a light reflecting material upon at least a portion of the inner surface including said reverse face; and a filler material contiguous with the inner surface and light reflecting material for reinforcing said shell-like body against forces applied externally by said contact with the oncoming vehicle.

9. The invention set forth in claim 8 wherein the alignment of each cube corner axis is within about 13° of the direction of the refracted light.

10. A pavement marker of claim 8 wherein said light reflecting material is a metallic reflecting material.

11. A pavement marker of claim 8 wherein said acute angle with the base is 15° to approximately 45°.

12. A pavement marker of claim 8 wherein said acute angle with the base is about 30°.

13. A pavement marker for providing a marking on a horizontal roadway surface, the marking being visible from an oncoming vehicle on the roadway, said pavement marker comprising:

a unitary molded shell of light transmitting synthetic resin material including a horizontal base for cooperatively engaging the roadway surface upon which the pavement marker is to be installed, a generally horizontal top raised above said roadway surface, opposite faces interconnecting said base and said top transverse to the direction of the oncoming vehicle and opposite sides interconnecting said base, top and faces, the faces and sides sloping at an acute angle to the horizontal, said shell having an outer surface and an inner surface;

a generally planar obverse light receiving and refracting face upon the outer surface of at least one of said opposite faces, said obverse face being oriented at an acute angle of about 30° with the horizontal base;

a light receiving and reflecting face upon the inner surface reverse to said obverse face;

a plurality of light reflecting elements in said reverse face for effecting reflection of light impinging thereon from said obverse face, each said element having three planar surfaces arranged mutually at right angles and meeting at a common point remote from said obverse face to form a cube corner, the axis through the cube corner of each said reflecting element being at an angle with the normal to said obverse face for allowing said reflecting elements to receive light emanating in a generally horizontal direction from the oncoming vehicle and refracted by said obverse as a result of said acute angle of about 30° and to reflect such light generally parallel to the direction of incidence of said light upon said obverse face after refraction at said obverse face;

a light reflecting material upon at least a portion of the inner surface including the reverse face; and a relatively rigid reinforcing material filling said shell between said top, base, opposite faces and opposite sides.

14. A pavement marker of claim 13 wherein the axis through the cube corner of each said reflecting element is generally aligned with the direction of said light refracted by said obverse face.

15. A pavement marker of claim 13 wherein the shell of light transmitting material has a predetermined index of refraction $u$ and light emanating generally horizontally from said oncoming vehicle impinges upon said obverse face at a predetermined angle of incidence $i$, the axis through the cube corner of each said reflecting element making an angle in the order of magnitude of $$\sin^{-1}\left(\frac{\sin i}{u}\right)$$

with the normal to the obverse face.

16. A pavement marker of claim 15 wherein $u$ is about 1.5 and said synthetic resin material is methyl methacrylate.

References Cited
UNITED STATES PATENTS

| | | | |
|---|---|---|---|
| 1,906,655 | 5/1933 | Stimson | 65—362 |
| 2,991,698 | 7/1961 | Leubaz | 94—1.5 |

JACOB L. NACKENOFF, *Primary Examiner.*